April 3, 1956     J. G. BEKKER     2,740,554
LIQUID DOSING APPARATUS
Filed June 15, 1953
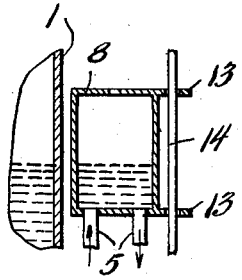
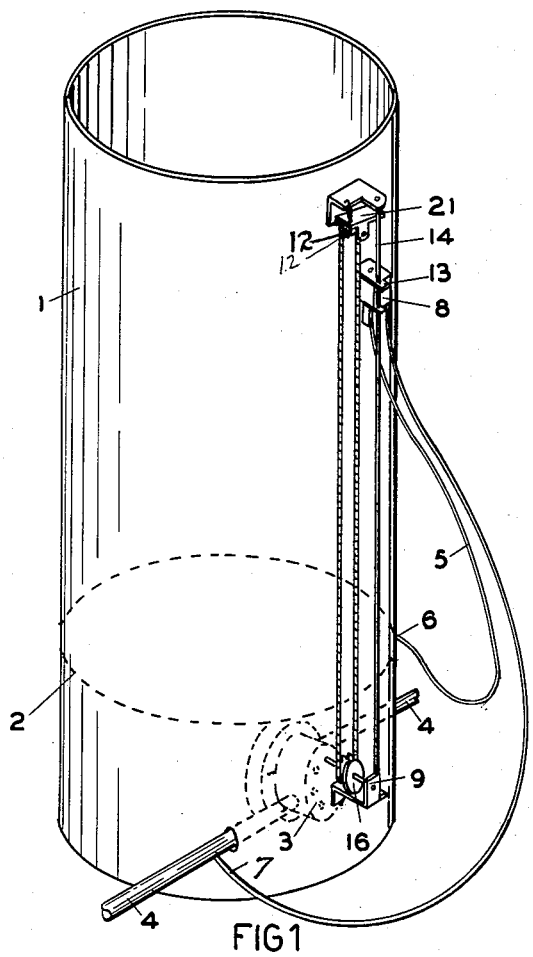
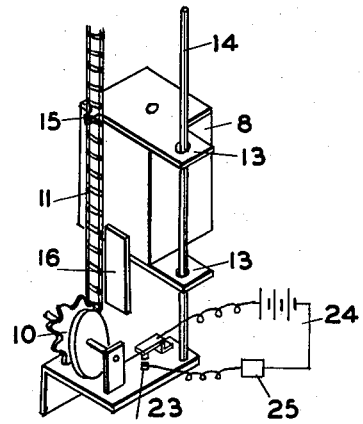
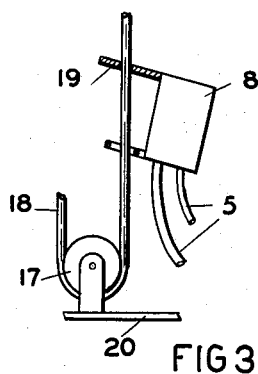
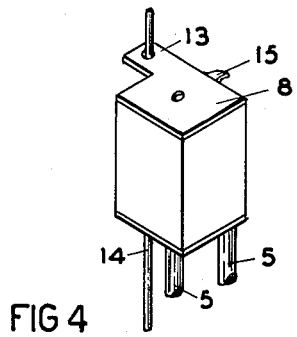
Inventor
Johan G. Bekker
By Watson, Cole, Grindle + Watson
Attorneys

United States Patent Office 2,740,554
Patented Apr. 3, 1956

2,740,554

LIQUID DOSING APPARATUS

Johan Godfried Bekker, Sandown, Johannesburg, Transvaal, Union of South Africa

Application June 15, 1953, Serial No. 361,748

Claims priority, application Union of South Africa June 26, 1952

5 Claims. (Cl. 222—39)

This invention relates to apparatus for automatically delivering a dosing solution into a liquid flowing through a conduit at a rate proportional to the rate of flow of said liquid.

It is the object of this invention to provide a liquid dosing mechanism which is economically constructed, operated directly by the flow of liquid to be dosed, and which avoids the use of nozzles and similar small orifices which are liable to be clogged.

According to this invention the dosing apparatus comprises a liquid flow meter form of rotor mechanism adapted to be connected in a pipe line, a flexible tube between a dosing container and a dosing liquid transfer receptacle and a second flexible tube connecting said receptacle to said pipe line, means operatively connected between the rotor mechanism and the tubes to lower the transfer receptacle and cause a corresponding drop in the level of the contents of the dosing container due to its contents flowing through the tubes into the pipe line, or the discharge therefrom, the rate of lowering of the receptacle being proportional to the rotational speed of the rotor mechanism.

An example of the invention as applied to the dosing of water in a pipe line is illustrated in the accompanying drawings, in which:

Fig. 1 is an isometric view of the dosing apparatus;

Fig. 2 is a detail on an enlarged scale;

Fig. 3 illustrates a modification;

Fig. 4 is a detail illustrating the transfer receptacle; and Fig. 5 is a fragmentary section showing the relationship between the liquid level in the dosing container, the liquid level in the transfer receptacle, the connections at the bottom of the transfer receptacle for the two conduits and the venting aperture.

As shown in Fig. 1, the apparatus comprises a dosing container 1, having an elevated base 2 under which is housed a liquid flow meter 3 connected in a pipe line 4 carrying the flow or a part of the flow of water to be dosed.

A length of rubber, plastic or like flexible tubing 5 is connected at one end 6 to the container 1 just above the base 2 and a further length of tubing connects at 7 to discharge into the flow of liquid to be dosed. To prevent any siphonic action in the lengths of the tube 5, the lengths of the tube 5, that is the lengths connecting with 6, 7, respectively are connected to a support having a dosing liquid transfer receptacle 8 which is open to atmosphere (see Fig. 4). Thus the dosing liquid will flow through the tube 5 from the container 1 into the flow from the pipe line 4 until level of the dosing liquid in the container 1 corresponds to the position of the receptacle 8.

The receptacle 8 is lowered, to allow the contents of the container to be discharged, by means of the rotor mechanism of the flow meter 3, which is of the accurate clock type.

The rotor mechanism may be used to lower the receptacle 8 in various ways. For example, as shown in Figs. 1 and 2, the spindle 9 for one of the arms of the clock face is connected to rotate a sprocket 10 which is connected by an endless chain 11 to a further sprocket 12 positioned above it. The receptacle 8 has a pair of perforated lugs 13 threaded on a guide 14 in the form of a rod and also a projecting tooth 15 bent down to engage one of the links of the chain 11 so that the receptacle 8 hangs thereon. Thus rotation of the sprocket 10 due to the turning of the meter rotor causes a corresponding movement of the chain 11 and lowering of the receptacle 8 until it has reached its lowermost position when the contents of the dosing container 1 have been fully discharged into the flow from the pipe line 4. At this point the receptacle 8 encounters a projection 16 which presses it away from the chain 11 causing the tooth 15 to disengage so that the chain 11 may continue to move freely without causing any damage to the apparatus.

An alternative form of receptacle 8 and lowering mechanism is shown in Fig. 3. In this case the meter spindle 9 is connected to a pulley 17 driving an endless belt 18. A hole in a plate 19 attached to the receptacle 8 and shown in section in Fig. 3 encircles the belt 18 which is preferably of round section so that when the plate 19 tilts at an angle to the horizontal under the weight of the receptacle 8 and the tube 5, it will frictionally engage the belt 18. When the receptacle 8 reaches the lowermost part of its travel it contacts a stop or platform 20 which supports it so that the plate 19 is positioned with the axis of its hole vertical allowing the belt 18 to move freely through it.

It will be clear that other means connected to the meter rotor may be used to lower the receptacle 8 at a rate dependant on the speed of rotation of the rotor and thus the rate of flow of liquid through the pipe line 4.

Normally the chain 11 or belt 18 will be kept taut by some form of tensioning device such as a jockey pulley or the pivoted and spring loaded mounting 21 for the spindle 22 of the sprocket 12 as illustrated in Fig. 1.

The dosing apparatus according to this invention may be easily calibrated and will operate for long periods without attention, but it is often desirable that some indication be given when the container requires replenishing. This may easily be done by fitting the receptacle 8 with a bridging member 23 which at the lowest point of its travel acts to close an electrical signalling circuit 24 with the actual signalling device such as a buzzer or bell 25 located at some convenient point remote from the dosing apparatus itself. This is advantageous, for instance, on cattle ranches where the water supplies for the cattle are dosed to make up for deficiencies in their diet.

What I claim as new and desire to secure by Letters Patent is:

1. A liquid dosing apparatus connected with a pipe line conveying liquid to be dosed, comprising a liquid flow meter type of rotor in said pipe line, a container for the dosing liquid, flexible tubing between the lower part of the container and the liquid to be dosed, a support and a dosing liquid transfer receptacle connected by one length of flexible tubing reaching to the receptacle when on a level with the top of the dosing liquid in the container, mechanism for lowering the support for the tube, means coupling said mechanism to said rotor to be moved thereby and a second length of flexible tubing connecting the receptacle with the liquid to be dosed.

2. A liquid dosing apparatus, comprising a pipe line conveying liquid to be dosed, a rotor driven by the flow of said liquid, a container for the dosing liquid, a flexible tube connected to the bottom of the container and to a dosing liquid transfer receptacle and a second flexible tube connecting the receptacle with the liquid to be dosed, means for lowering said receptacle and mechanism connecting said means to the rotor.

3. In a liquid dosing apparatus as claimed in claim 2 means for automatically releasing said receptacle from said lowering means at the bottom of its travel.

4. A liquid dosing apparatus, comprising a pipe line conveying liquid to be dosed, a rotor driven by the flow of said liquid, a container for the dosing liquid, flexible tubing between the bottom of the container and a dosing liquid transfer receptacle, a second flexible tube between the receptacle and the liquid to be dosed, an endless chain driven by the rotor, means for connecting said receptacle to the endless chain and automatic means for disconnecting the receptacle from said endless chain at the bottom of its travel.

5. In a liquid dosing apparatus as claimed in claim 4 signalling means for signalling the position of said receptacle in relation to the level of the dosing liquid in the container.

References Cited in the file of this patent

UNITED STATES PATENTS

| | | |
|---|---|---|
| 1,900,142 | Wallace | Mar. 7, 1933 |
| 1,900,143 | Wallace | Mar. 7, 1933 |
| 2,365,298 | Sebald et al. | Dec. 19, 1944 |
| 2,423,379 | Geiser | July 1, 1947 |
| 2,626,728 | Harper | Jan. 27, 1953 |
| 2,633,750 | Langstaff | Apr. 7, 1953 |